(12) United States Patent
Sugiura et al.

(10) Patent No.: US 6,282,314 B1
(45) Date of Patent: *Aug. 28, 2001

(54) IMAGE PROCESSING METHOD AND APPARATUS WHICH ITERATIVELY DIVIDES IMAGE DATA INTO SUB-REGIONS

(75) Inventors: Susumu Sugiura, Atsugi; Takeshi Makita, Kawasaki; Mitsuru Maeda, Yokohama; Osamu Yamada, Yokohama; Hiroshi Mori, Yokohama, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/524,409

(22) Filed: Sep. 6, 1995

(30) Foreign Application Priority Data

Sep. 8, 1994 (JP) .................................................. 6-214645

(51) Int. Cl.[7] ........................................................ G06K 9/34
(52) U.S. Cl. ............................ 382/173; 358/453; 358/538
(58) Field of Search .............................. 358/434, 262.1, 358/443, 455–458, 453, 401, 500, 538; 382/240, 302, 307, 100, 171, 172, 173, 175–180; 348/588

(56) References Cited

U.S. PATENT DOCUMENTS

| | | | | |
|---|---|---|---|---|
| 4,893,188 | * | 1/1990 | Murakami et al. | 358/456 |
| 5,187,592 | * | 2/1993 | Sugiyama et al. | 358/430 |
| 5,280,547 | * | 1/1994 | Mahoney | 382/302 |
| 5,282,059 | * | 1/1994 | Fukushima et al. | 358/456 |
| 5,297,219 | * | 3/1994 | Weldy | 382/299 |
| 5,371,610 | * | 12/1994 | Sugawa | 358/434 |
| 5,387,983 | * | 2/1995 | Sugiura et al. | 358/434 |
| 5,465,164 | | 11/1995 | Sugiura et al. | 358/448 |
| 5,475,496 | * | 12/1995 | Kumada | 358/298 |
| 5,521,990 | * | 5/1996 | Ishizawa et al. | 382/270 |
| 5,533,148 | * | 7/1996 | Sayah et al. | 382/240 |
| 5,557,689 | * | 9/1996 | Huttenlocher et al. | 382/177 |
| 5,568,571 | * | 10/1996 | Willis et al. | 382/254 |
| 5,644,648 | * | 7/1997 | Bose et al. | 382/177 |
| 5,748,794 | * | 5/1998 | Maeda et al. | 382/251 |

FOREIGN PATENT DOCUMENTS 5-233873    9/1993 (JP) .

* cited by examiner

Primary Examiner—Jay Patel
(74) Attorney, Agent, or Firm—Fitzpatrick, Cella, Harper & Scinto (57) ABSTRACT

An object of the invention is to convert multivalue image data to data in a format which can be easily handled. For such an object, the multivalue image data of each pixel is inputted and an image expressed by the multivalue image data is converted to data which is hierarchically structured to a plurality of layers.

14 Claims, 7 Drawing Sheets

<ORIGINAL IMAGE>

IMAGE PROCESSING METHOD AND APPARATUS WHICH ITERATIVELY DIVIDES IMAGE DATA INTO SUB-REGIONS

BACKGROUND OF THE INVENTION

1. Field of the Invention

The present invention relates to image processing method and apparatus for analyzing characteristics of image data of each pixel.

2. Related Background Art

Conventional methods of forming retrieval keywords in an electronic file system consist of mainly the following two methods.

(I) Method in which image data is read from an image input apparatus such as a scanner or the like and the operator manually inputs a retrieval keyword.

(II) Method of reading the image data from an image input apparatus such as a scanner or the like, recognizing a character image in an original image, and automatically adding a retrieval keyword.

Although the method of (I) is a certain method and the retrieval keyword can be set independent of the input image, the operator needs to add the keyword every time and it is troublesome from a viewpoint of the operation.

According to the method of (II), since the characters in the image are recognized and are automatically added for retrieval, the operation is simple.

The method of (II), however, has the following problems.

That is, an image in which only character portions are extracted, namely, which is binarized by what is called an optimal threshold process is preferable as an image for the character recognition, so that it is undesirable to execute a halftone process even to an image in which original image includes a halftone image. Therefore, a case such that the portion of the halftone image perfectly becomes black or white and the contents of the image in such an area cannot be recognized occurs.

On the other hand, an image processed so as to relatively accurately conform to the original image is requested as an image to be displayed or recorded.

Therefore, the image binarized by the optimal fixed threshold is necessary for character recognition and the image which was halftone processed is necessary to display/record. The image suitable for the character recognition isn't always suitable for the image to display/record, and vice versa.

SUMMARY OF THE INVENTION

The invention is made in consideration of the above problems and an object of the invention is to convert multivalue image data to data in a form which can be easily handled.

According to the invention, such an object is accomplished by an image processing method comprising the steps of: inputting multivalue image data of each pixel; and sequentially converting an image which is expressed by the multivalue image data into data which is hierarchically structured to a plurality of layers.

Another object of the invention is to efficiently execute an area division in accordance with the kind of image.

According to the invention, such an object is accomplished by an image processing method comprising the steps of: inputting image data representing an image; determining a first threshold based on the image data; binarizing the image data by comparing the image data with the first threshold and generating first binary data; dividing the image into a plurality of partial areas in accordance with the first binary data; determining a second threshold based on the image data in one of the partial areas; binarizing the image data in the partial area by comparing the image data with the second threshold and generating second binary data; and dividing the partial area into a plurality of sub-partial areas in accordance with the second binary data.

Still another object of the invention is to easily provide an image format which is adaptive to each function of an electronic file.

Further another object of the invention is to provide a data structure in which image data doesn't excessively increase for various requests regarding image processes.

The above and other objects and features of the present invention will become apparent from the following detailed description and the appended claims with reference to the accompanying drawings.

DETAILED DESCRIPTION OF THE PREFERRED EMBODIMENT

Functions necessary for an electronic filing can be mainly classified as follows.

(I) Character recognizing function for recognizing character images included in image data from the image data and for coding.

(II) Function for recognizing the contents and position information of a photograph, a table, and the like in the image data.

(III) Retrieval instructing unit for retrieving (designation information such as character, image position, and the like is used).

(IV) Function for displaying and recording retrieval result image data.

And the like.

An embodiment of the invention relates to a method of providing optimal image data to each of the above functions.

That is, the embodiment of the invention relates to a method of storing an input image in the form suitable for the electronic file and, more particularly, to a system in which a character portion is recognized from the input image by using an OCR technique and is coded, the position information and schematic contents of a photograph portion, a table portion, and the like are recognized, and this information is used for retrieval.

The invention can be applied not only to the retrieval of the electronic file but also to other purposes such that, for example, the image data is efficiently compressed and used for communication, and the like.

A characteristic construction in the embodiment of the invention is that the image data of the optimal form is provided for a plurality of functions (for example, character recognition, display/record) in the apparatus. For instance:

(I) For the character recognizing function, it is intended to provide an image of a form such that the input image is binarized by an optimal fixed threshold so as to make a character portion conspicuous and to delete a background portion.

(II) As an image to be outputted to a CRT or a printer, it is intended to provide an image such that the entire image is changed to a halftone image or the halftone is adaptively changed in accordance with an image area.

(III) At a retrieval stage, it is intended to execute a retrieval character designation and an image retrieval from the image position information and its contents.

The following two methods can be considered as methods which satisfy the above conditions:

(I) The above-mentioned three kinds of images or information are prepared for one input image.

(II) The input image is analyzed, the image and information are held like a hierarchical structure, and necessary data of the image information structure is prepared in accordance with the request of each function.

Although the method of (I) is simple, since a plurality of image data need to be held, an image data amount increases.

Although the method of (II) is complicated, the image data amount is small.

According to the embodiment, an original image is binarized by the optimal threshold adapted to the input multivalue image and is sent to a block selection (BS) processing unit which has already been proposed by the applicant of the present invention in U.S. patent application Ser. No. 08/336,070 filed on Nov. 4, 1994, and U.S. patent application Ser. No. 08/383,174 filed on Feb. 3, 1995, and the image is divided into, for example, a character portion, an image portion including a photograph, and a table portion in accordance with the kind of image area. With respect to the areas other than the character portion, a threshold value for binarization adapted to the area is again determined from area information and is again sent to the BS processing unit and a check is made to see if the character portion or the table portion exists or not. The above processes are repeated until no character and table portions exist. The character portions are re-binarized by the optimal threshold in the character portion area and are combined to form character data.

As mentioned above, the above problems are solved by a method of hierarchically dividing the original image so as to be suitable for the application of each function by using an image area dividing method (BS) in which the original image of multivalues is divided by using the binary image data in accordance with the kind of partial image area of the original image. As an example of the simplest methods of solving the above problems, there is a method in which a plurality of image data adapted to the functions are hierarchically held.

A specific embodiment of the invention will now be described hereinbelow with reference to the drawings.

Figure 2:
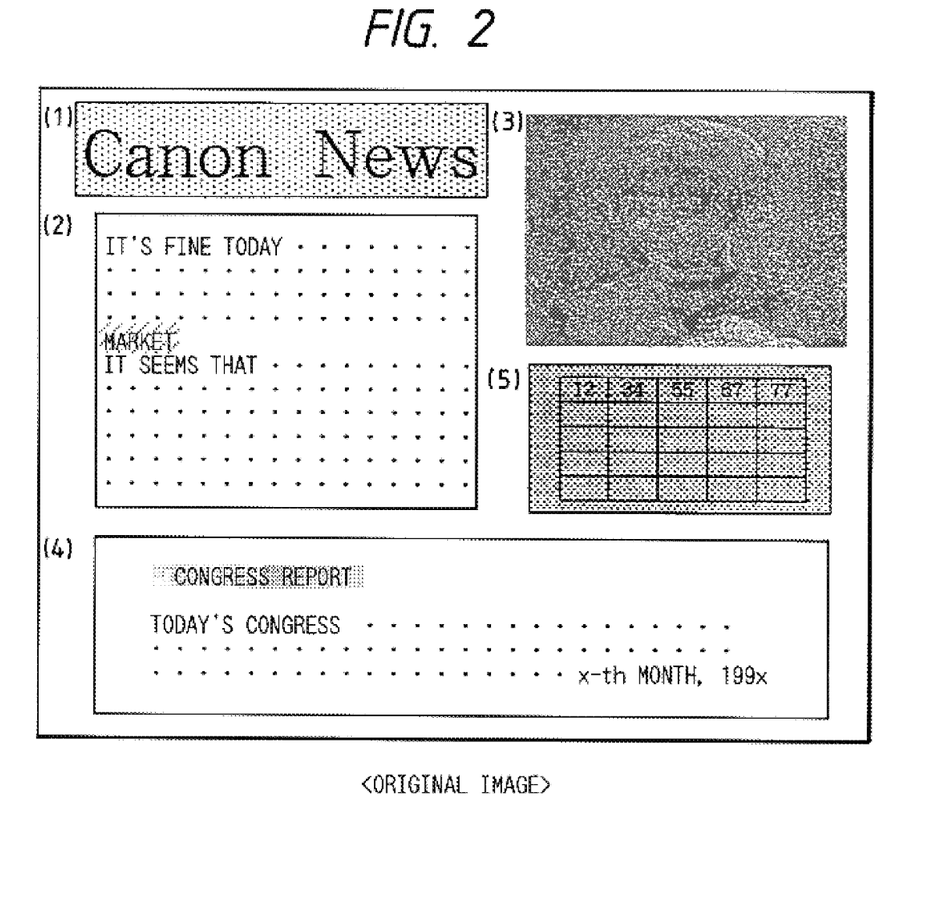
FIG. 2 is a diagram showing an example of an original image.

FIG. 2 shows an example of an original image for explaining the embodiment.

In FIG. 2, reference numeral (1) denotes a title portion in which it is assumed that the background is constructed in pale gray; (2) sentences described laterally by characters of the 12-point size on a white background; (3) a black-and-white photograph of 256 gradations; (4) a title portion in which the background is constructed in relatively dark gray and sentences vertically written by characters of the 10-point size are written in the region other than the title portion; and (5) a table covered by a relatively dark gray region.

Figure 3:
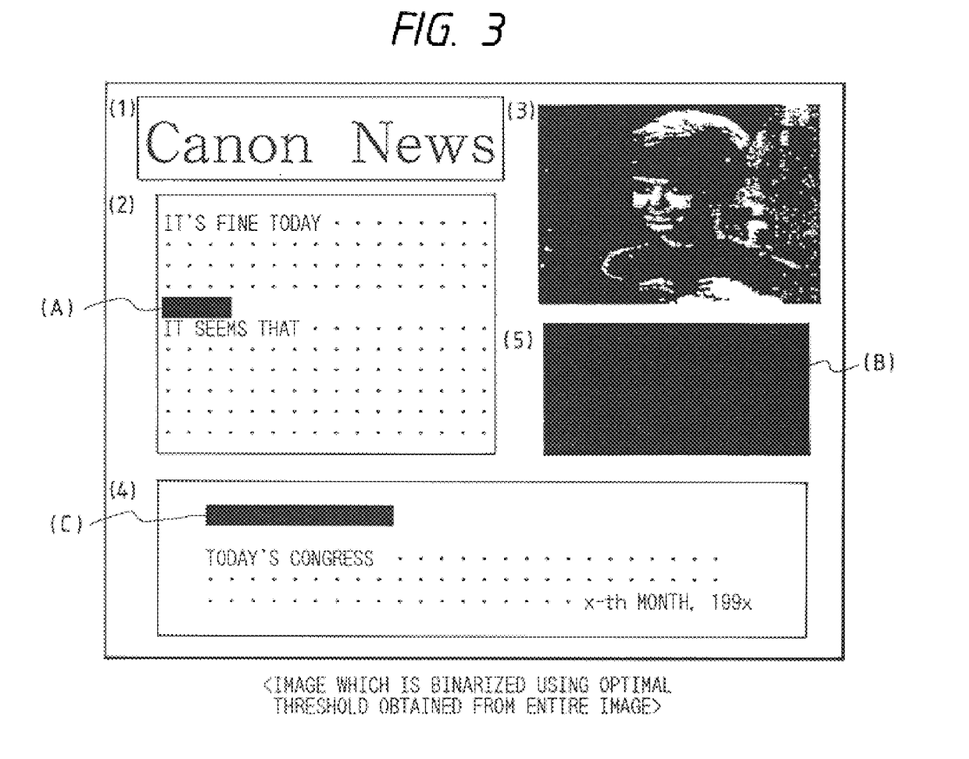
FIG. 3 is a diagram showing an example of a binarization.

FIG. 3 is an image binarized by the optimal threshold determined from the entire image. The optimal threshold can be obtained by, for instance, obtaining a histogram from a density distribution of the image data of the entire image.

Namely, an intermediate level between the maximum and minimum density levels is obtained or a density level of a highest frequency is obtained with respect to each of a high density area and a low density area, respectively, and the intermediate level between those high density levels is used.

By performing a technique of what is called a block selection by using the binary image data of FIG. 3, the portion of (1) is recognized as a character area and the portions other than the (A) portion in (2) and the portions other than the (C) portion in (4) are judged as character portions. In this instance, in addition to the judgement of the character area, the size of character and the writing direction of the characters are also judged. The block selection can be realized by using, for example, a technique such as an area dividing method disclosed in Japanese Patent Application Laid-open No. 5-233873 or the like.

In FIG. 3, the portions of (A), (3), (5), and (C) are judged as non-character portion areas. With respect to the areas judged as non-character portions, the optimal threshold of each area is again determined.

Figure 4:
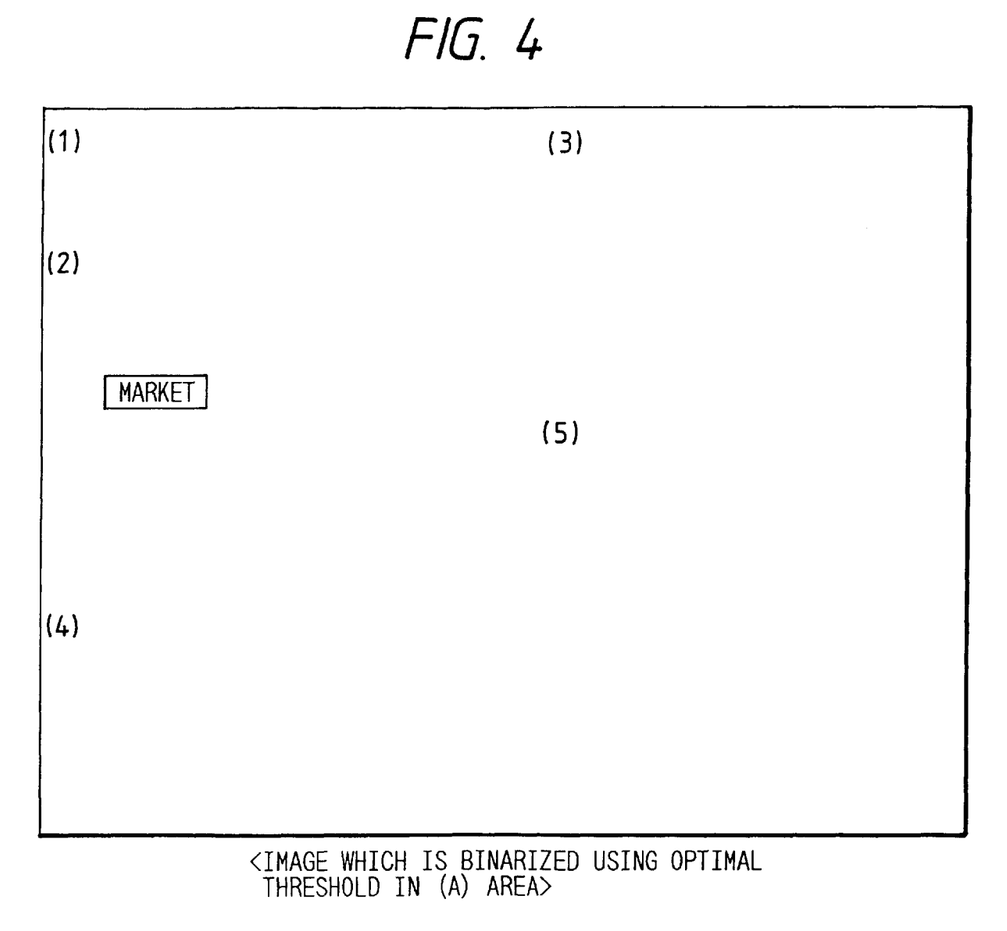
FIG. 4 is a diagram showing an example of the binarization.

When the area of (A) in FIG. 3 is re-binarized by the optimal threshold in the area, a character portion appears as shown in FIG. 4, this portion is recognized anew as a character area by again executing the block selection.

Figure 6:
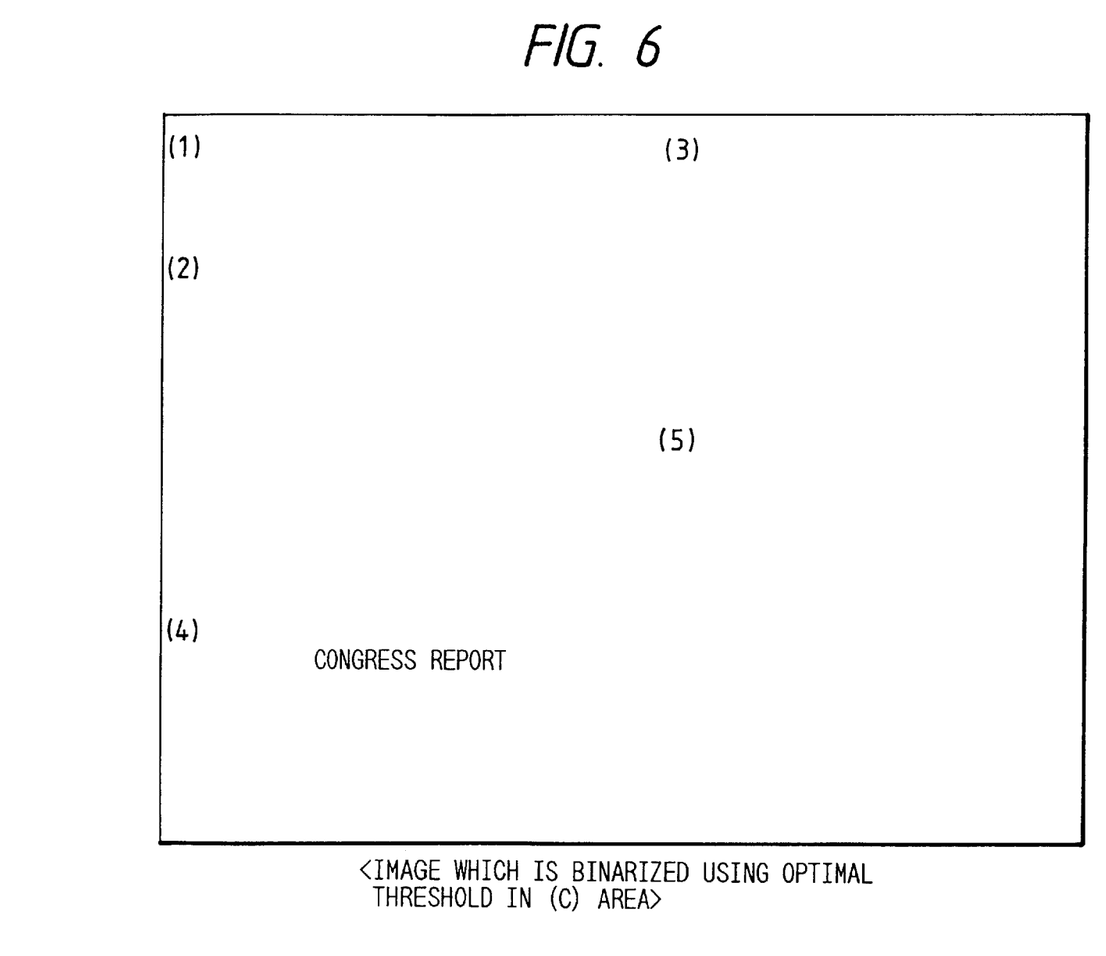
FIG. 6 is a diagram showing an example of the binarization.

In a manner similar to the above, the portion of (C) in FIG. 3 is recognized anew as a character portion as shown in FIG. 6. With respect to the portion of (3), even when the image binarized by the decided optimal threshold of such a portion is judged by the block selection, the image cannot be discriminated as a character portion but is again judged as a non-image portion. The portion of (3) is, therefore, judged as an image portion including a photograph.

Figure 5:
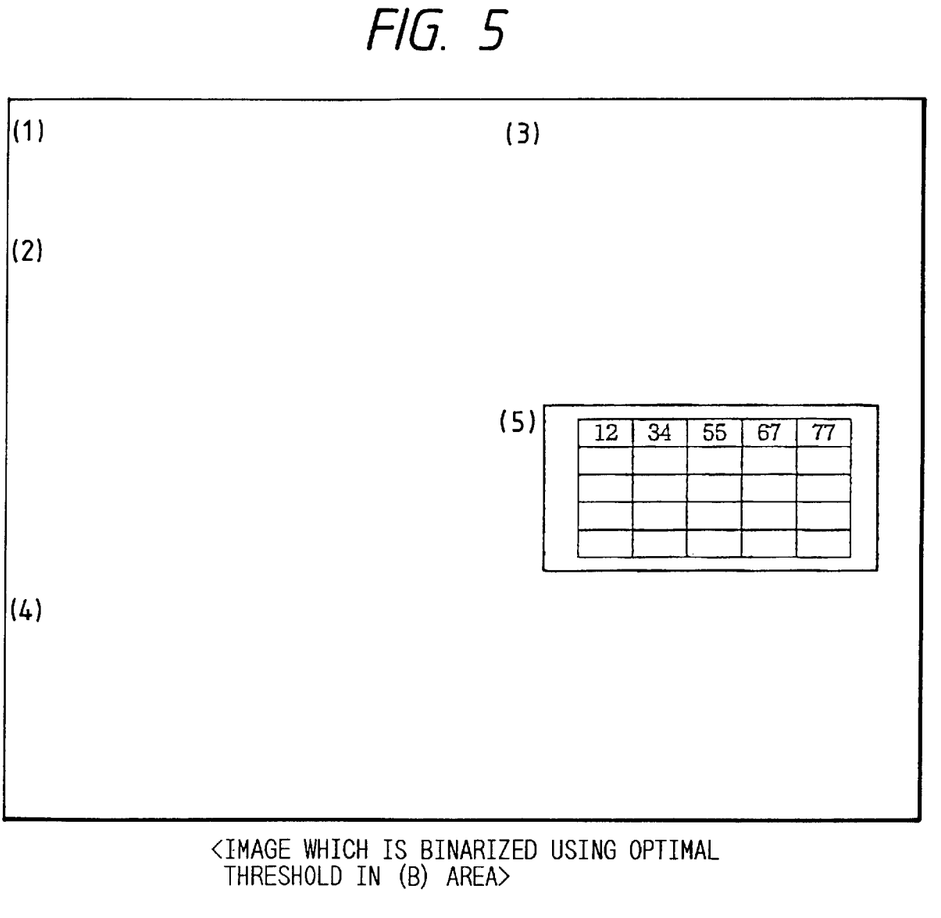
FIG. 5 is a diagram showing an example of the binarization.

On the other hand, by binarizing the portion of (5) in FIG. 3 by the optimal threshold of the area, it is judged as a table area as shown in FIG. 5.

Figure 1:
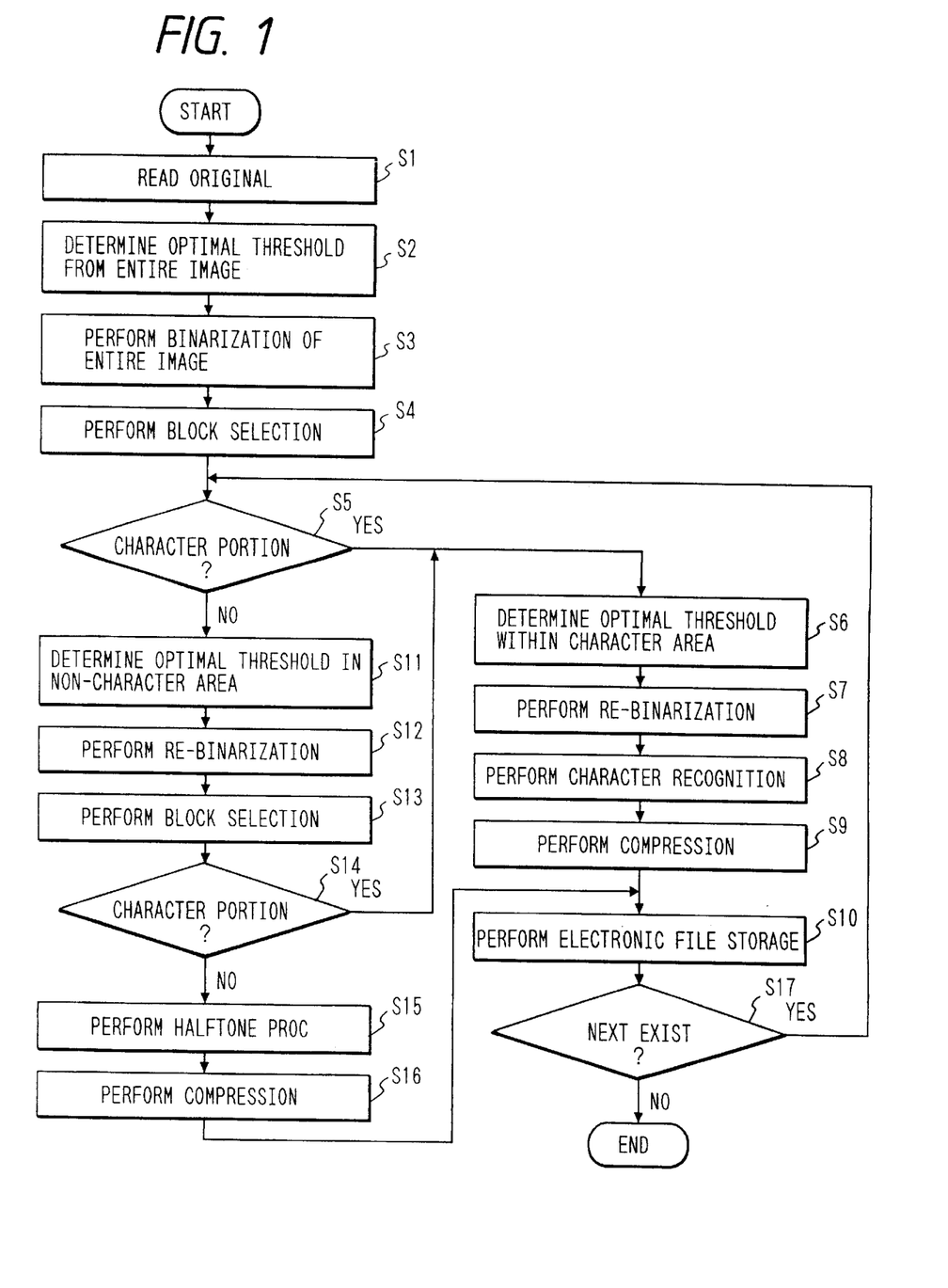
FIG. 1 is a flowchart showing processes by a host computer of an embodiment of the invention.
Figure 7:
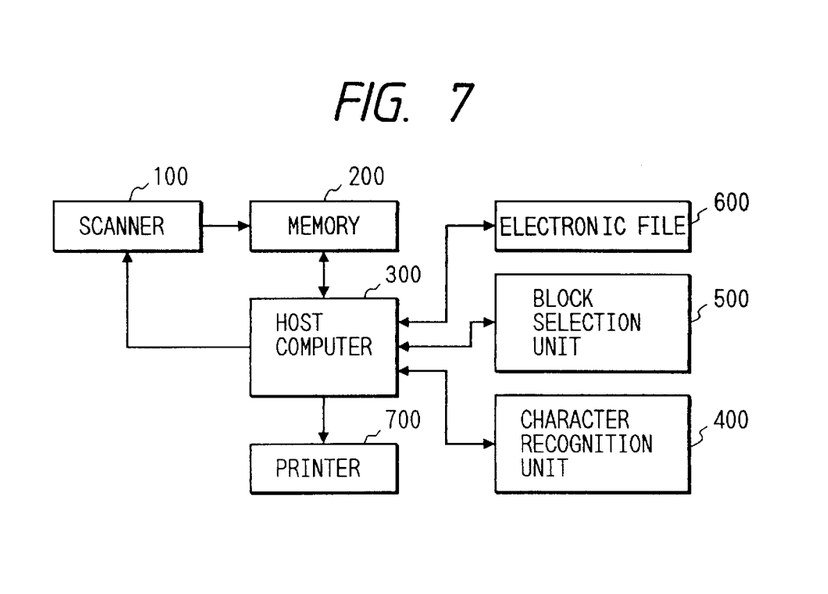
FIG. 7 is a block diagram showing a whole construction of an example of an apparatus which realizes the invention.

FIG. 1 is a diagram showing a whole control flow of the embodiment. FIG. 7 is a block diagram showing a whole construction.

In FIG. 7, reference numeral 100 denotes a scanner for scanning an original and generating multivalue image data; 200 a memory for storing the image data from the scanner and transmitting/receiving the image data to/from a host computer 300; 300 the host computer which manages a whole control of the embodiment; 400 a character recognition unit for performing the character recognition; 500 a block selection unit for judging the kind of image area on a block unit basis; 600 an electronic file which stores hierarchically structured information and can be retrieved and the like; and 700 a printer for forming a visible image on a medium in accordance with the image data from the host computer.

A processing procedure of the host computer 300 of the embodiment will now be described with reference to FIG. 1.

An original is read by the scanner in FIG. 7 and is stored as multivalue image data into the memory 200 (step S1). The first optimal threshold is calculated as mentioned above from the entire original image and is determined (step S2). The entire image is binarized by the threshold (step S3). The image binarized by the threshold is a binary image shown in FIG. 2. The binary data of FIG. 2 is transferred to the block selection unit 500 and is subjected to the block selection (step S4), the areas of (1), (2), and (4) are judged as character areas and the portion (A) in (2) and the portion (C) in (4) are judged as image areas at the first time. Similarly, the portions of (3) and (5) are also judged as image areas. Such a result is received as position information and content information representing the kind of image of the area specified by the position information from the block selection unit 500.

The areas judged as non-character areas are the four areas of (A), (B), (C), and (3). The other areas are judged as character areas (step S5). The image data in the character areas is again read out from the memory 200, the optimal threshold is obtained (step S6), and the image data is re-binarized (step S7) and is transferred to the character recognition unit 400. Thus, with respect to the character image portions, the character codes, sizes of the characters, and the like are recognized (step S8). On the other hand, the character image portion is compressed as necessary (step S9) and stored as character image data into the electronic file 600. The character information of such a portion is added with character codes, character positions, character size data, and character portion image data and is combined.

As mentioned above, the character portion data at three positions are formed in the binary image of the first time.

The non-character image portion data is sequentially read out from the memory portion in the host computer to which the position information of a plurality of non-character image data have temporarily been stored, the original image data is again read out from the memory 200, and the optimal threshold in the area is obtained (step S11). In case of FIG. 3, when the optimal threshold in the area of (A) is obtained and the binarization is performed (step S12), an image as shown in FIG. 4 is obtained. By supplying such binary image data to the block selection unit 500 (step S13), "market" held in the original image can be read as shown in FIG. 4 and the area (A) is recognized as a character portion (step S14). However, even when the image data of the portion of (3) is read and the optimal threshold is again obtained and the re-binarization is executed, the character and table portions don't appear. Therefore, even when the image data is sent to the block selection unit 500, it is judged that no character portion exists (step S14). The portion is consequently judged as data of a non-character and non-table portion. Similarly, when the optimal threshold in the (B) portion is obtained and the re-binarization is executed, a table appears as shown in FIG. 5. When the data is sent to the block selection unit 500, this portion is judged as a table area. In a manner similar to the (A) portion, with respect to the portion of (C), by obtaining the optimal threshold in this portion and executing the re-binarization, characters appear and "CONGRESS REPORT" are seen (FIG. 6). When the data of this portion is sent to the block selection unit 500, the data is recognized as a character area and information such as positions of the characters, sizes of the characters, and the like are also recognized.

On the other hand, the halftone images are subjected to the halftone process (step S15), compressed (step S16), and stored into the electronic file 600.

Figure 8:
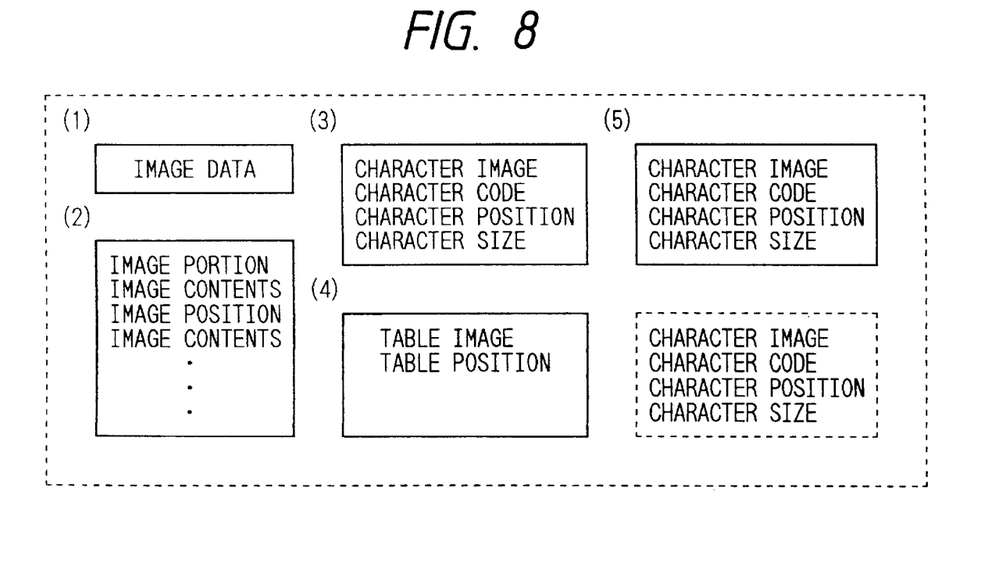
FIG. 8 is a diagram showing an example of data which is hierarchically structured.

The above processes are repeated (step S17), each of the image data stored in the electronic file 600 forms one image data as a whole as shown in FIG. 8 and is used for an image data exchange with each function in the apparatus or the outside.

In the function in the apparatus or the external application which received the image of this form, the following processes are executed.

(I) When the recognition is executed by the character recognition which the function in the apparatus or the application has, the character recognition is executed by using the character image data of the portions (1), (2), (4), (A), and (C) in FIG. 3. Thus, the image in which only the character portions of the original appear and which is optimal to the OCR is added to the application.

(II) When a printing is executed by the function in the apparatus or the application, the image data of (1) in FIG. 2 is outputted. Thus, an output including the halftone is enabled.

(III) In case of a retrieval application, when the retrieval is executed by the character code, the character code data which coincides with the retrieval information is extracted from the character codes of the portions (3) and (5) in FIG. 2 and the relevant image data is displayed. When the retrieval data is the image position information, an image which coincides with the information designated by the image position information and image contents of the portion of (4) in FIG. 2 is displayed. When the retrieval is executed on the basis of the table, the retrieval is executed on the basis of the portion of (4) in FIG. 1 and the table is displayed.

As shown in (1) to (5) in FIG. 2, by using the images obtained by hierarchically structuring the original image, the images suitable for the plurality of functions requested by the function in the apparatus or the outside application can be used, so that it is very convenient as an image holding format.

The image has been divided into the following kinds of images in case of storing into the electronic file 600 in the above description: namely, the entire halftone image;

the image areas and the contents of each image area;

the character image and its code data, character position, and character size; and the table image data and table position.

However, as a simplest and practical example, it is also possible to divide the image into:

the entire halftone image; and the character codes of the whole character portion.

According to the conventional method, a situation such that although the retrieval can be performed, the original image cannot be partially read at all since there is no halftone component in the output display record image occurs. By using the image data hierarchical structure method of the embodiment, however, the following effects can be obtained.

(I) The image data optimal to the plurality of functions requested by the apparatus can be provided to the functions.

(II) A capacity of the image data which was hierarchically structured is smaller than that in case of simply having a plurality of image data.

(III) Thus, an electronic filing apparatus in which a high retrieval efficiency is obtained and a picture quality when the retrieval result is displayed and recorded is high can be constructed.

As mentioned above, according to the invention, the multivalue image data can be converted to the data in the form which can be easily handled.

It is sufficient that "the optimal threshold" in the above description is preferable, not necessarily the best.

In addition to the method of obtaining the optimal threshold by the above-mentioned histogram, it can be also obtained on the basis of the maximum and minimum values of the image data.

When the image is divided into the partial areas in accordance with its kind, the image can be also divided in accordance with, for example, a character arrangement such as vertical writing, lateral writing, or the like in addition to the character, halftone, and table.

As a foregoing halftone process, for instance, there is an area gradation process such as a dither process or a process such as an error diffusion method or the like.

As a foregoing compressing process, for example, there is a compression using a dynamic arithmetic operation coding of JBIG or a compression such as MH, MR, or the like.

The processes in FIG. 1 which are executed by the host computer 300, character recognition unit 400, and block selection unit 500 can be also realized by a computer by installing a computer program stored in a memory medium such as optical disk, floppy disk, or the like into the computer.

What is claimed is:

1. An image processing method for processing multivalue image data representing an image that includes a first portion and a second portion, comprising the steps of:

inputting the multivalue image data; and sequentially converting the image represented by said multivalue image data into hierarchically structured data, wherein said converting step includes a step of dividing the image into a plurality of partial areas in accordance with image data corresponding to the image, the plurality of partial areas including the first portion and the second portion, said second portion having a first subportion and a second subportion, a step of separating a sub-Partial area from said first subportion by using a threshold determined by multivalue image data included in said first subportion, and a step of separating a sub-partial area from said second subportion by using a threshold determined by multivalue image data included in said second subportion.

2. A method according to claim 1, further comprising the step of compressing said hierarchically structured data.

3. A method according to claim 1, further comprising the step of communicating said hierarchically structured data with an outside media.

4. A method according to claim 1, wherein said hierarchically structured data has image data for character recognition, image data for display/print, and a plurality of code data groups for retrieval.

5. A method according to claim 1, wherein said conversion is executed by discriminating the kind of image area on the basis of different discrimination parameters step by step.

6. A method according to claim 1, wherein the plurality of layers are divided to form the plurality of partial areas in accordance with different kinds of partial image areas of the image represented by said multivalue image data.

7. A method according to claim 6, wherein the plurality of partial areas include a character portion, an image portion and a table portion.

8. A method according to claim 7, wherein non-character portions of the plurality of partial areas are further divided in said step of dividing the partial areas into the plurality of sub-partial areas.

9. An image processing method for processing image data representing an image that includes a first portion and a second portion, comprising the steps of:

outputting the image data representing the image;

determining a first threshold based on the image data corresponding to said image;

binarizing the image data by comparing the image data with the first threshold and generating resultant first binary data;

dividing the image into a plurality of partial areas in accordance with the first binary data, the plurality of partial areas including the first portion and the second portion, the second portion including a first subportion and a second subportion;

determining a second threshold in the second subportion of said second portion based on image data included in said second subportion;

binarizing the image data in the second subportion by comparing the image data with the second threshold and generating resultant second binary data; and dividing the second subportion into sub-partial areas in accordance with the second binary data.

10. A method according to claim 9, wherein said partial area is a character area or a non-character area.

11. A method according to claim 9, further comprising the step of recognizing characters in said partial areas or sub-partial areas.

12. A method according to claim 9, further comprising the step of performing a halftone processing to a halftone area in said sub-partial areas.

13. A method according to claim 12, further comprising the step of compressing the image data and storing into a file.

14. A medium which stores computer programs for use with an image processing for processing multivalue image data representing an image that includes a first portion and a second portion, comprising the steps of:

causing a computer to output image data representing an image;

causing the computer to determine a first threshold based on the image data corresponding to said image;

causing the computer to binarize the image data by comparing the image data with the first threshold and to generate first binary data;

causing the computer to divide the image into a plurality of partial areas in accordance with the first binary data, the plurality of areas including the first portion and the second portion, the second portion including a first subportion and a second subportion;

causing the computer to determine a second threshold in the second subportion of said second portion based on image data included in said second subportion;

causing the computer to binarize the image data in the second subportion by comparing the image data with the second threshold and to generate second binary data; and causing the computer to divide the second subportion into sub-partial areas in accordance with the second binary data.

* * * * *

UNITED STATES PATENT AND TRADEMARK OFFICE
CERTIFICATE OF CORRECTION

PATENT NO. : 6,282,314 B1
DATED : August 28, 2001
INVENTOR(S) : Sugiura et al.

It is certified that error appears in the above-identified patent and that said Letters Patent is hereby corrected as shown below:

Column 5,
Line 57, "are" should read -- is --.

Column 7,
Line 39, "sub-Partial" should read -- sub-partial --.

Signed and Sealed this

Fourth Day of June, 2002

*Attest:*

*Attesting Officer*

JAMES E. ROGAN
*Director of the United States Patent and Trademark Office*